Jan. 17, 1961    E. A. BENDER    2,968,373
DERRICK STRUCTURE
Filed Feb. 3, 1954    9 Sheets-Sheet 1
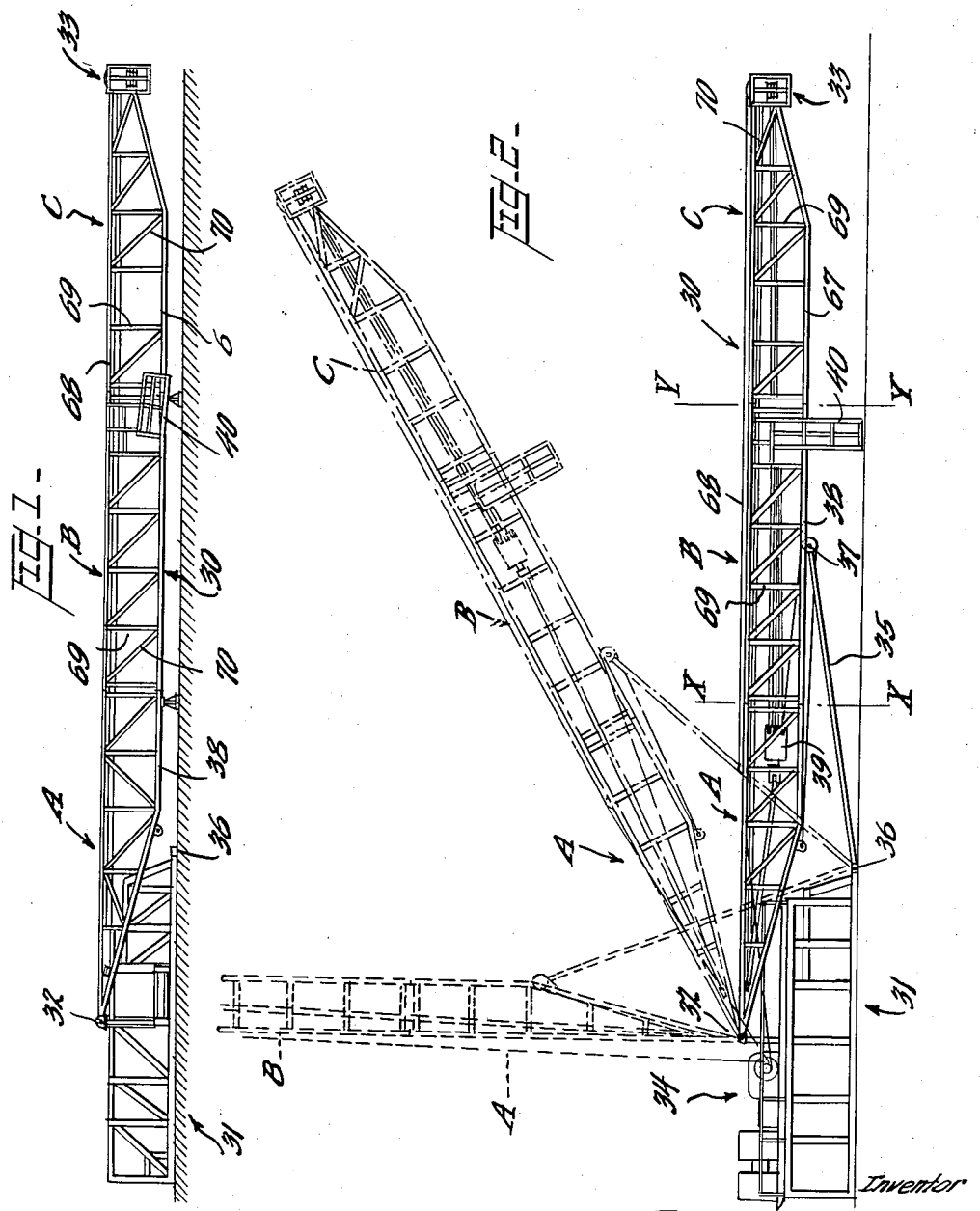
Inventor
Emil A. Bender
BY
Parker and Dahl
ATTORNEYS Jan. 17, 1961
E. A. BENDER
2,968,373
DERRICK STRUCTURE
Filed Feb. 3, 1954
9 Sheets-Sheet 2
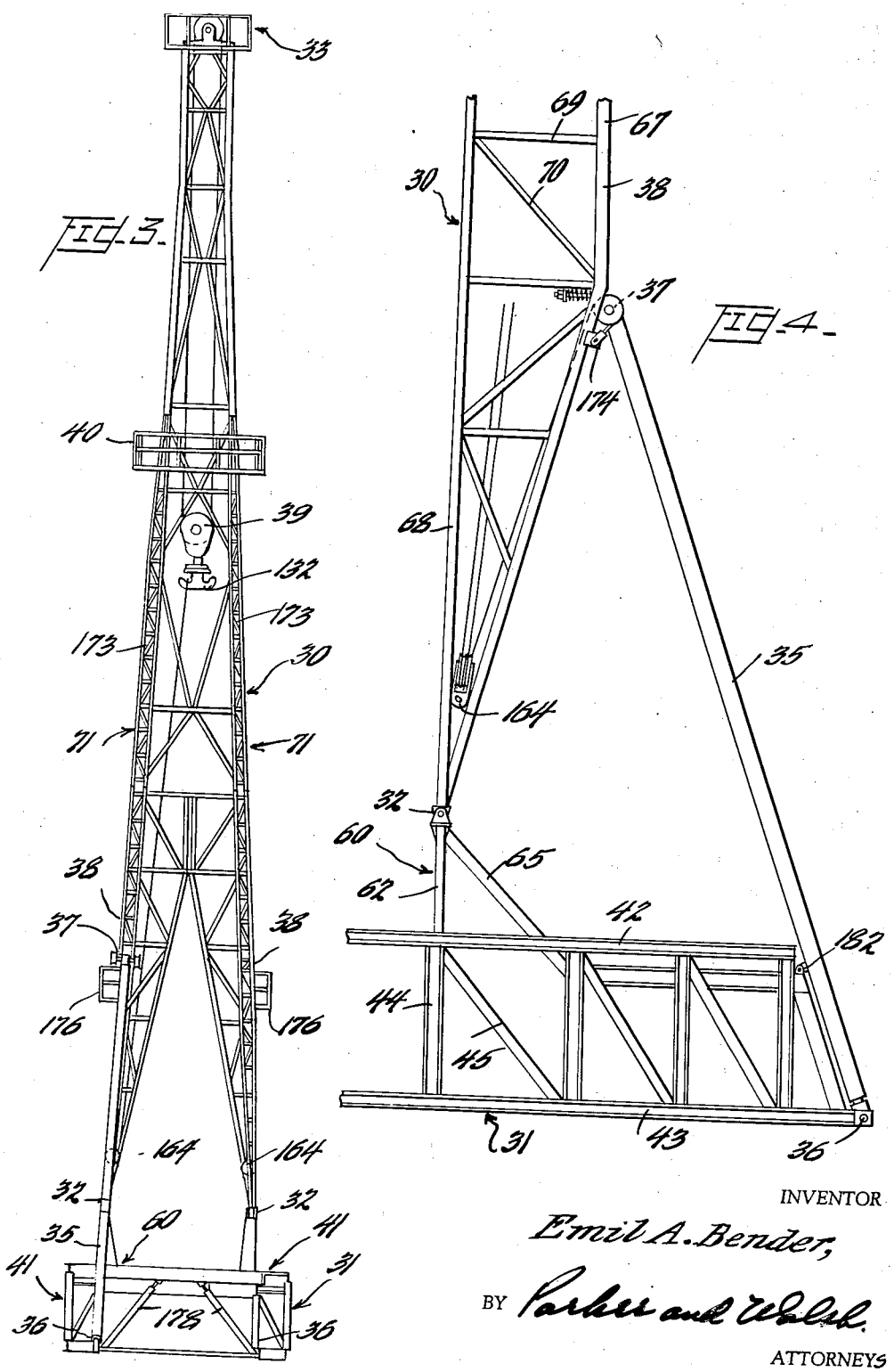
INVENTOR
Emil A. Bender,
BY Parker and Walsh
ATTORNEYS

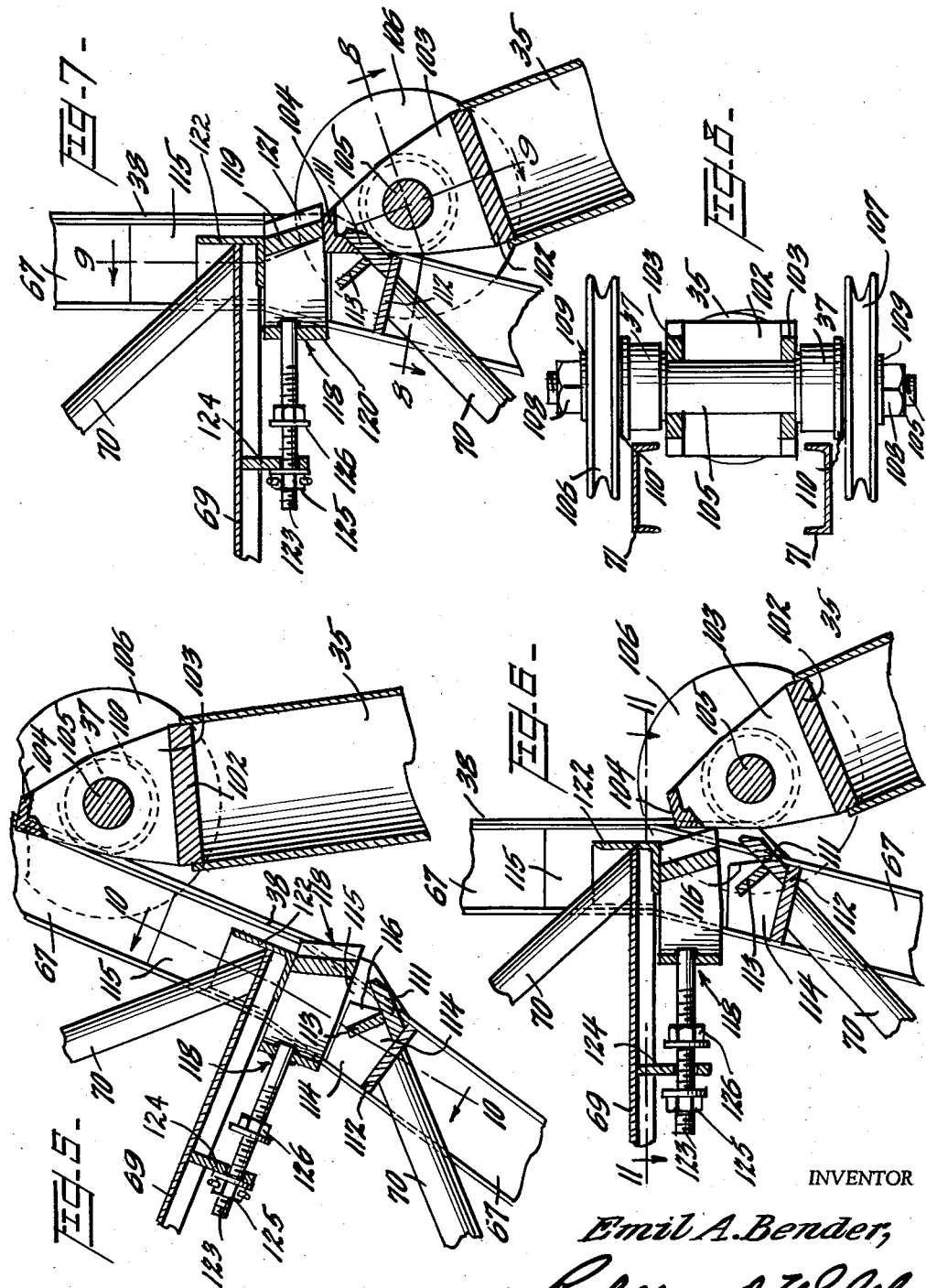

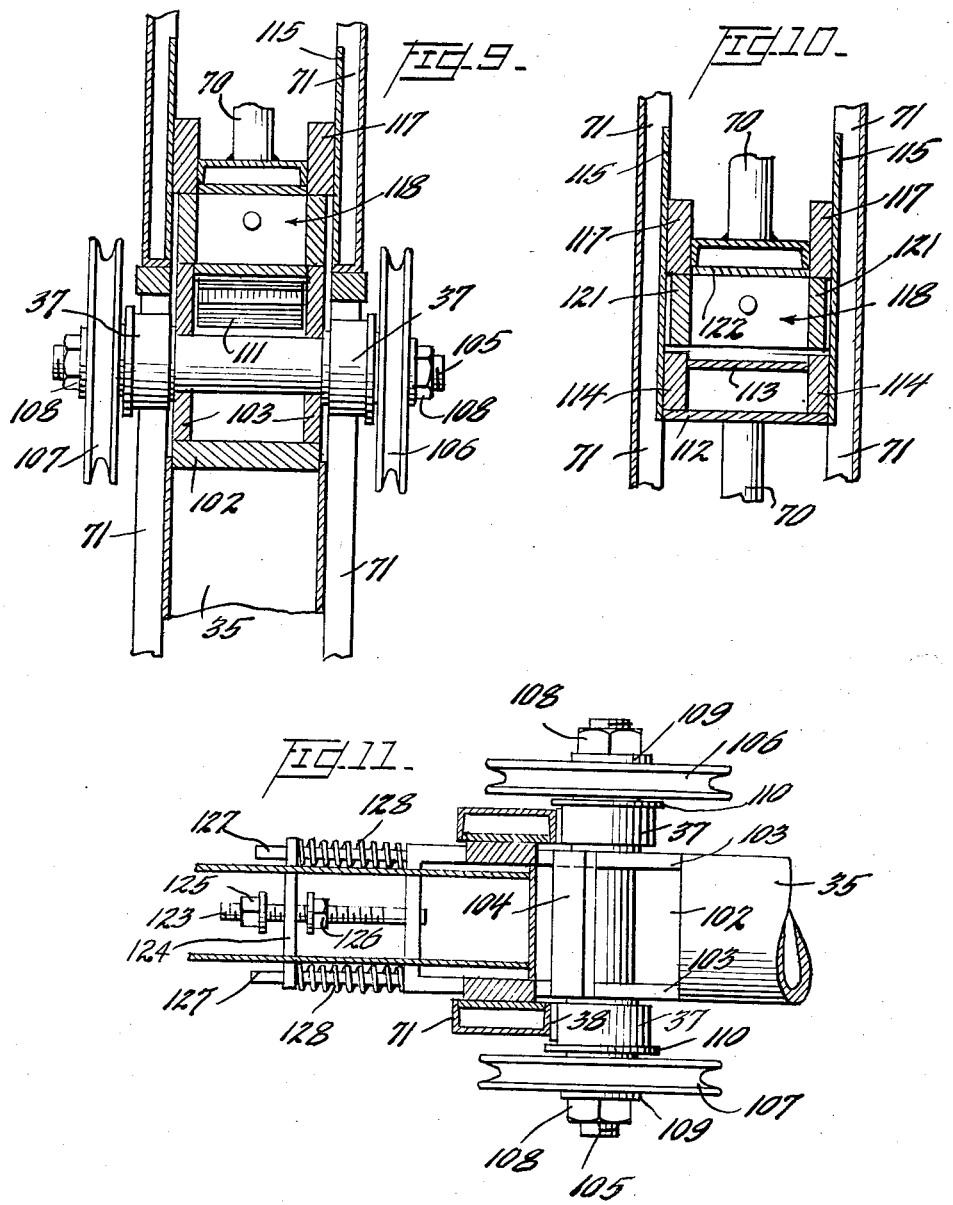

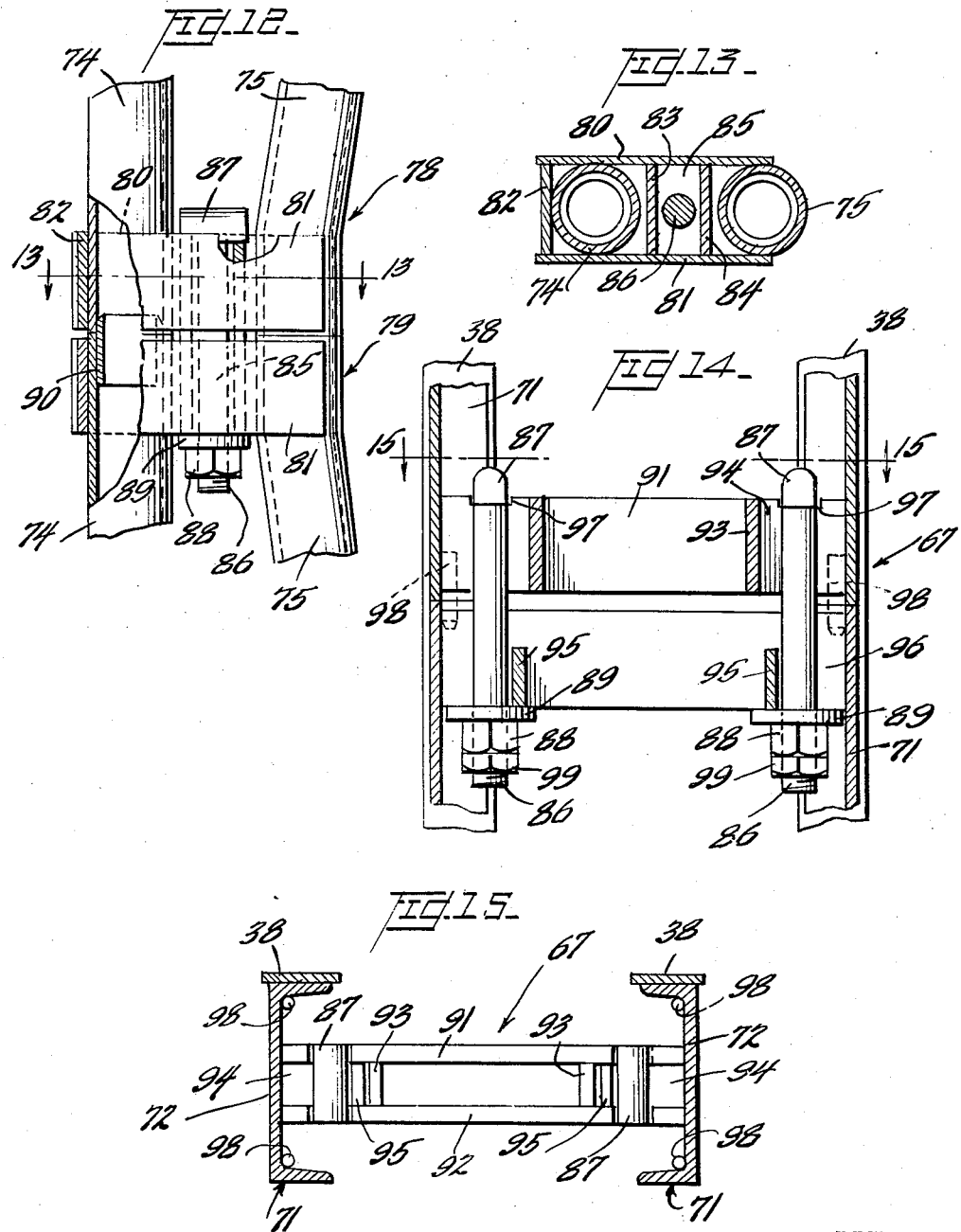

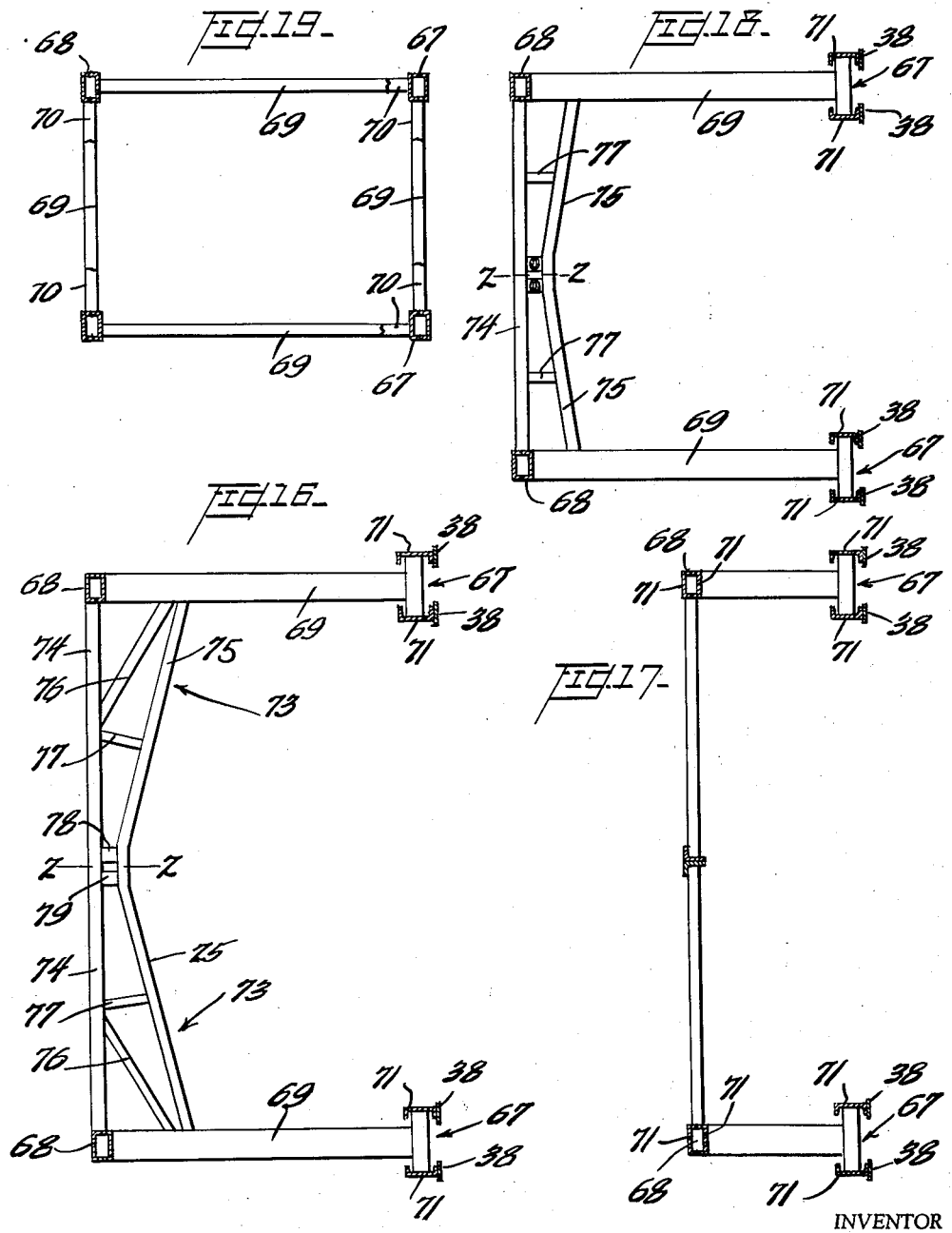

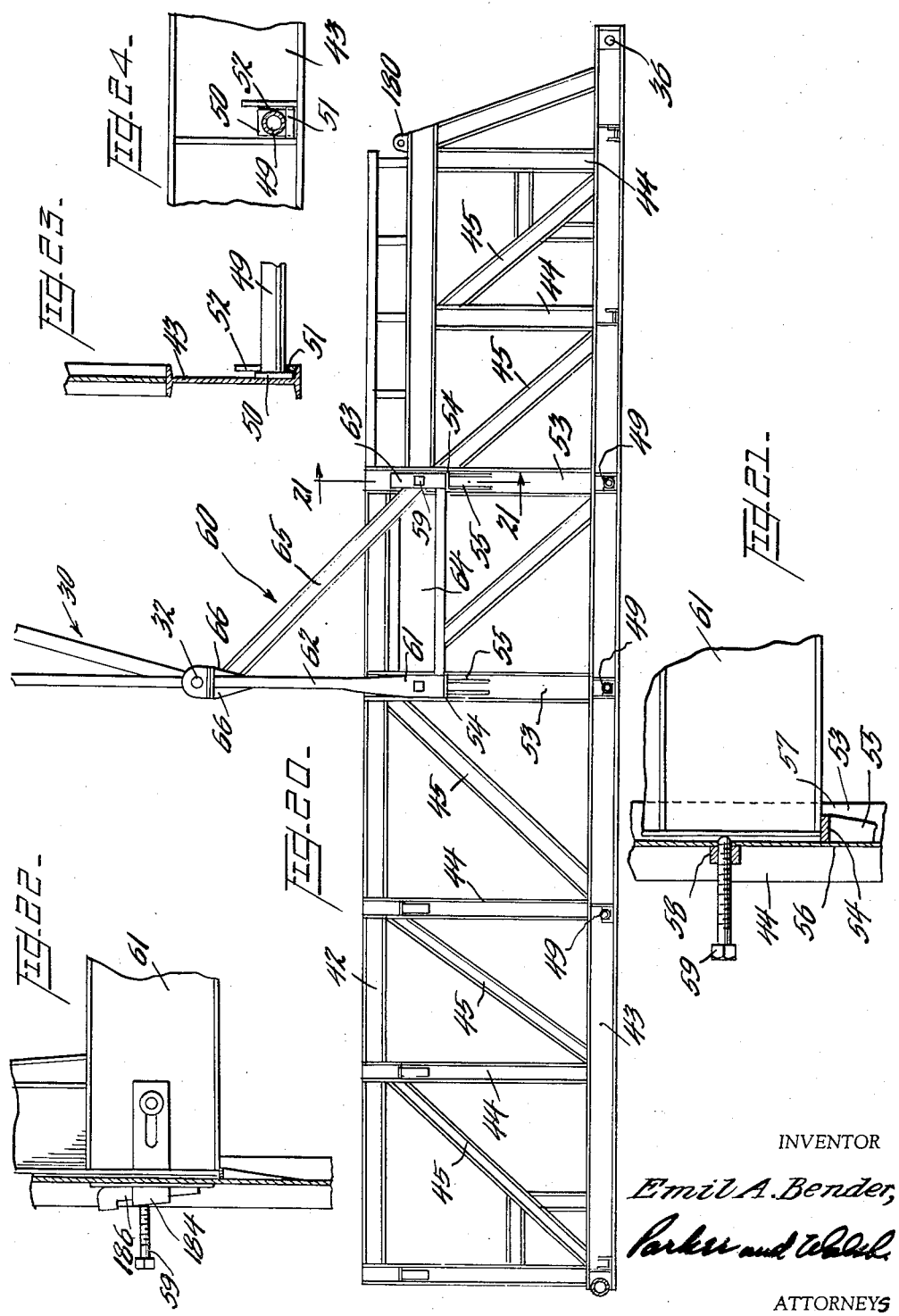

Jan. 17, 1961 E. A. BENDER 2,968,373
DERRICK STRUCTURE
Filed Feb. 3, 1954 9 Sheets-Sheet 8
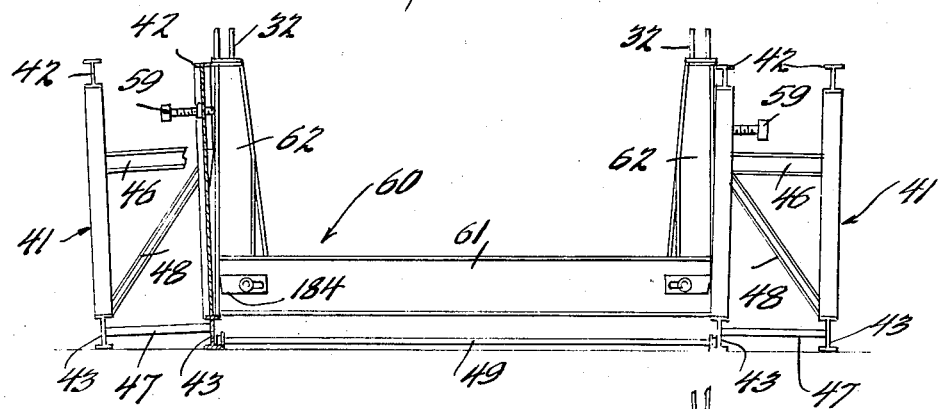
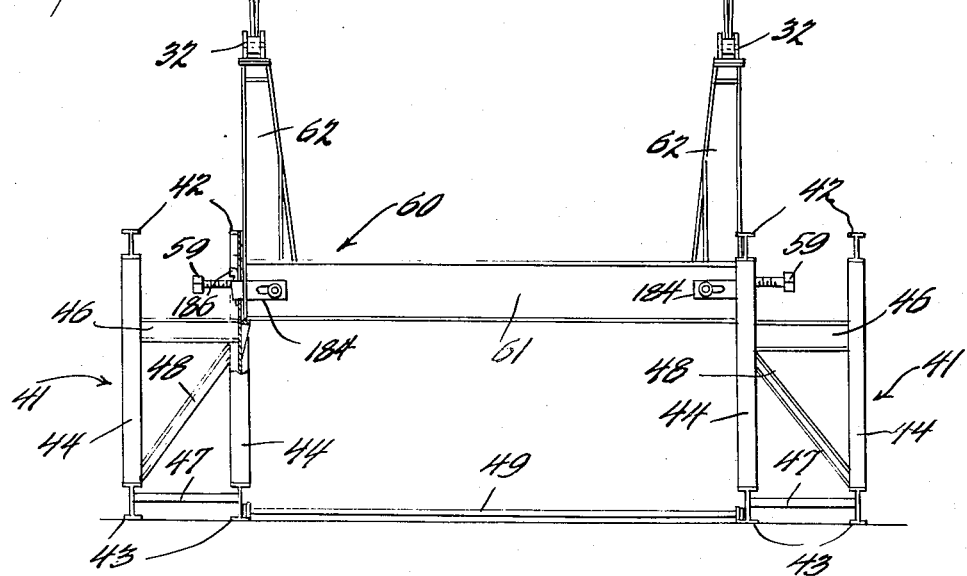
INVENTOR
Emil A. Bender,
BY Parker and Welch
ATTORNEYS

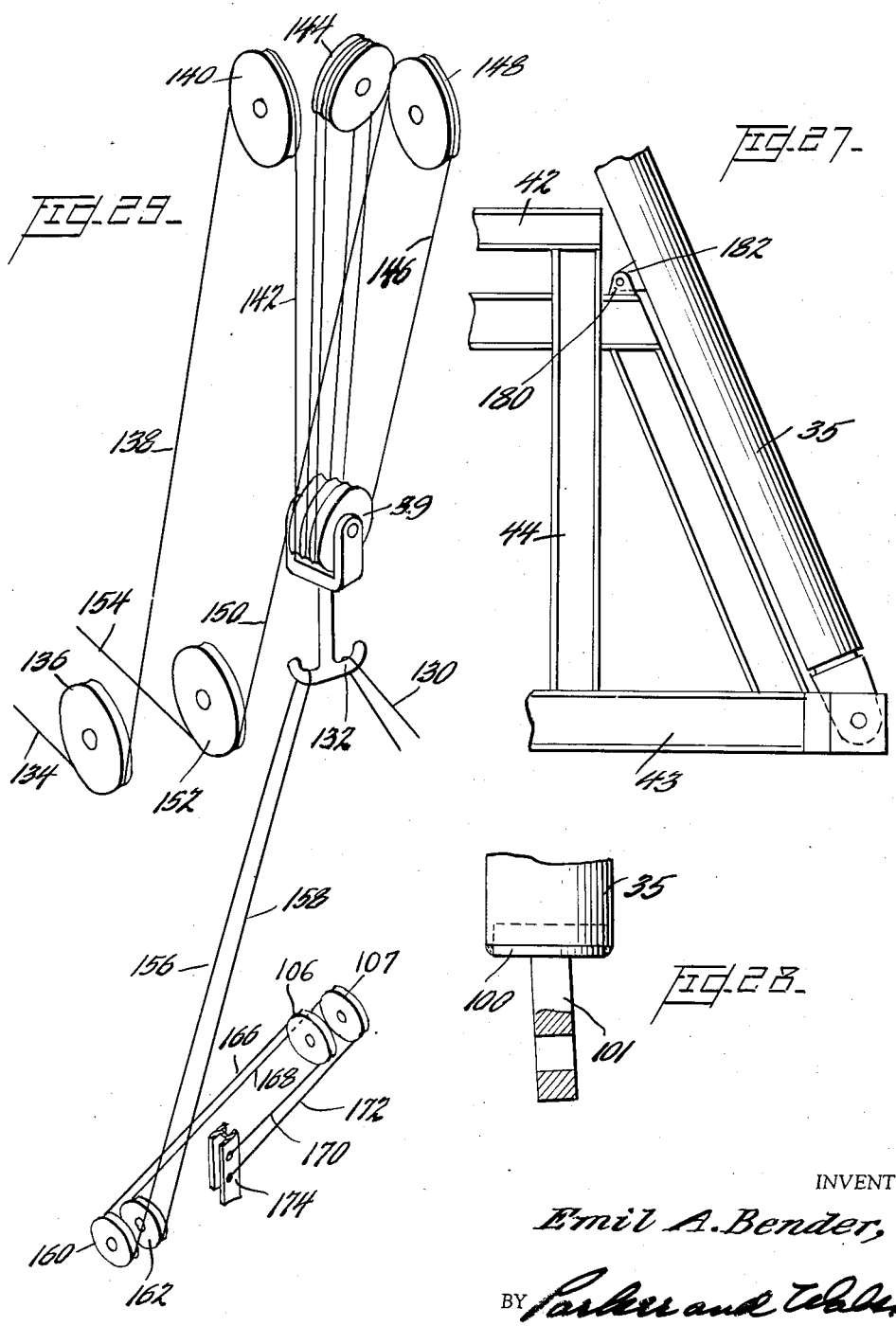

United States Patent Office 2,968,373
Patented Jan. 17, 1961

2,968,373
DERRICK STRUCTURE
Emil A. Bender, P.O. Box 52, Bakersfield, Calif.
Filed Feb. 3, 1954, Ser. No. 407,893
5 Claims. (Cl. 189—15)

This invention relates generally to oil derricks. More particularly this invention relates to portable oil derricks of the type which may be repeatedly assembled and disassembled and readily transported between various sites for the successive drilling of a relatively large number of different oil wells in various locations.

The oil derrick in accordance with the present invention is, in certain aspects, considered to be an improvement upon the derrick as disclosed in my prior Patent No. 2,593,246, issued April 15, 1952. As set forth generally in my said prior patent, the use of portable oil well drilling derricks has become increasingly prevalent in recent years due largely to the many advantages which this type of derrick possesses over the older type permanently installed derrick. Aside from certain minor operations which may be required infrequently after a well has been completed, an oil derrick is useful only during the actual drilling of the well which takes a relatively short time as compared with the total productive life of the well. However, as is common knowledge among those skilled in the art, an oil derrick is a massive and costly structure and, when assembled as a permanent installation at the well, it is usually not economically feasible to dismantle a permanent derrick installation after the well has been completed. As a result, considerable money may be tied up in the well in the form of a virtually useless permanent derrick installation whereas the portable type derrick may be moved from one drilling site to another and used over and over again, thereby achieving large savings in the cost of drilling oil wells.

On the other hand, as is also well known to those skilled in the art, there are a number of disadvantages or drawbacks which have tended to be present in a greater or lesser extent in substantially all portable derricks heretofore known in the art. For example, in order to achieve compliance with various statutes limiting the maximum load and the dimensions thereof which may be transported upon public highways, and at the same time to provide a portable derrick big enough to do an effective job, it has been found necessary to construct such portable derricks in a relatively large number of sections which must all be bolted together at the drilling site each time the derrick is to be used. While this is generally not true of smaller derricks, it does limit the effective use of large size derricks since the expense involved in assembling the various derrick sections tends to reduce the advantage of portability as the derrick size increases.

From another standpoint, and for reasons which are deemed too highly technical to warrant their inclusion in detail in the present specification, it is most desirable that a derrick, of whatever type, be relatively free from internal bracing and, at the same time, be as completely open, particularly at the front, as possible. Broadly, this requirement results from the nature of the well drilling operation in the course of which the man in charge thereof, the driller, must have as clear and unimpeded a view of the entire derrick interior as it is possible to obtain. Such freedom from interior bracing is not too difficult to obtain in a permanent type derrick but in the case of a portable derrick, this requirement becomes increasingly difficult to achieve in view of the overall size and weight limits which must be met in order to achieve true portability.

It is, accordingly, a principal object of the present invention to provide a derrick structure which may be readily and inexpensively assembled or disassembled at various well sites but, at the same time, maintains the overall weight and dimensions of the various derrick sections within such limits as to achieve true portability.

Another object of the invention is to provide a portable derrick of the type described which possesses the requisite strength and rigidity necessary in a large size derrick and yet retains a simplicity of construction affording a minimum of internal bracing or obstruction to the front derrick opening.

A further object of the invention is to provide a portable derrick of the type having the main derrick body pivotally connected to the base and movable into raised position by means of a lifting leg also pivotally connected to the base and slidably engageable with the derrick body, including a releasable, positive latch mechanism automatically operable as the derrick body approaches elevated position to lock said body and said lifting leg together so that the latter becomes a rigid part of the derrick structure during drilling operations.

An additional object of the invention is to provide a portable derrick of sectional construction in which the derrick hinge assembly is mounted for limited vertical movement relative to the sub-base so that the derrick body sections may be connected together in substantially horizotal position and thereafter the hinge assembly may be elevated and locked in raised position thereby affording increased leverage during the raising of the main derrick body.

A still further object of the invention is to provide a novel method of elevating a portable derrick of the type described.

Yet another object of the invention is to provide an improved quick release fastener for rapidly assembling and disassembling the various parts of a sectional portable derrick of the type described.

The foregoing as well as other and further objects and advantages of the invention will become more readily apparent to one skilled in the art from a consideration of the following detailed specification taken in conjunction with the accompanying figures of drawing in which:

Figure 1 is a side elevational view of a portable derrick in accordance with the present invention showing the various derrick sections in the substantially horizontal inoperative position which they occupy during assembly and prior to elevating the hinge assembly relative to the base to initiate a derrick raising operation;

Figure 2 is a side elevational view of the derrick of Figure 1 but illustrating three different positions in sequence during a derrick raising operation;

Figure 3 is a front elevational view showing the derrick of Figure 1 in fully raised or operative position;

Figure 4 is a fragmentary side elevational view of the derrick of Figure 1 illustrating, to a somewhat larger scale, the lower portion of the derrick body and sub-structure with a derrick in fully elevated position;

Figure 5 is a fragmentary vertical cross-sectional view taken through one of the lifting legs and one of the front legs of the derrick body in a plane substantially parallel to the sides of the derrick, illustrating in detail an automatic latching mechanism in accordance with the present invention with the parts in the position which they occupy throughout the major portion of the derrick raising operation;

Figure 6 is a detailed vertical cross-sectional view similar to Figure 5 but illustrating the parts of the derrick body, lifting legs, and latching mechanism in the relative positions which they occupy just prior to completion of a derrick raising operation;

Figure 7 is a detailed vertical cross-sectional view similar to Figures 5 and 6 but illustrating the same parts in the relative positions which they occupy immediately after completion of a derrick raising operation;

Figure 8 is a generally horizontal cross-sectional view taken substantially along the line 8—8 of Figure 7;

Figure 9 is a generally vertical cross-sectional view through the improved latching mechanism taken substantially along the line 9—9 of Figure 7;

Figure 10 is also a generally vertical cross-sectional view through the latching mechanism but taken substantially along the line 10—10 of Figure 5;

Figure 11 is a generally horizontal cross-sectional view taken transversely through one of the front legs of the derrick substantially along the line 11—11 of Figure 6;

Figure 12 is a top plan view of one of the girt splices at the central portion of the rear face of the derrick with parts broken away to show the interior construction;

Figure 13 is a vertical cross-sectional view in a plane substantially parallel to the sides of the derrick taken through the rear face girt splice substantially along the line 13—13 of Figure 12;

Figure 14 is a cross-sectional view illustrating one of the front leg splices and taken through one of the front legs of the derrick in a substantially vertical plane parallel to the front face of the derrick;

Figure 15 is a generally horizontal cross-sectional view taken through one of the front legs of the derrick just above a splice therein and substantially along the line 15—15 of Figure 14;

Figure 16 is a generally horizontal transverse cross-sectional view taken through the entire derrick body at the upper portion of the lower section thereof;

Figure 17 is a transverse cross-sectional view through the derrick body similar to Figure 16 but taken horizontally through the lower portion of the lower section of the derrick and being partially broken away for accommodation;

Figure 18 is a transverse cross-sectional view through the derrick body similar to Figures 16 and 17 but taken in a generally horizontal plane through the middle section of the derrick body;

Figure 19 is a transverse cross-sectional view similar to Figures 16, 17 and 18 but taken in a generally horizontal plane through the upper or top section of the derrick body;

Figure 20 is a view largely in vertical elevation illustrating the derrick base and hinge assembly but taken in a plane located centrally of the derrick base and extending from front to rear thereof;

Figure 21 is a fragmentary detailed view in vertical cross-section taken substantially along the line 21—21 of Figure 20;

Figure 22 is a view similar to Figure 21 but illustrating in part a locking device for securing the derrick hinge assembly to the base;

Figure 23 is a fragmentary detailed view illustrating the manner in which the lowermost transverse stringers are attached to the beams of the derrick base;

Figure 24 is a view similar to Figure 23 but taken generally at right angles to the latter;

Figure 25 is a transverse cross-sectional view taken in a vertical plane extending entirely through the derrick base and illustrating the initial or lowered position of the derrick hinge assembly relative to the base at the beginning of a derrick raising operation;

Figure 26 is a transverse view through the derrick base similar to Figure 25 but illustrating the derrick hinge assembly in elevated position at a later stage during a derrick raising operation;

Figure 27 is a fragmentary side elevational view illustrating a detail of the lifting leg pivot;

Figure 28 is a fragmentary detailed view, partially broken away, illustrating the offset hinge of the derrick lifting leg; and Figure 29 is a wholly diagrammatic view illustrating the manner of reeving the cables through the fixed and movable pulleys for raising or lowering the derrick body relative to the base.

Referring now in somewhat greater detail to the various figures of the drawing and in particular to Figures 1, 2 and 3 thereof, there is illustrated an improved derrick in accordance with the present invention comprising a main derrick body designated generally by reference numeral 30 which is mounted for pivotal movement with respect to a substructure or base designated generally by reference numeral 31. It will be appreciated that as actually constructed the derrick body 30 may be 120 to 140 feet or more in length and as a result the drawings illustrating the overall derrick must, of necessity, be largely schematic. However, in general the main derrick body 30 comprises a plurality of detachable sections which in the present case are three in number and comprise a lowermost or bottom section A, a middle or center section B, and an uppermost or top section C. As shown in Figures 1 and 2, the lowermost section A is tapered downwardly, or to the left in Figures 1 and 2, terminating in a hinge point designated generally by reference numeral 32 while the top section C is likewise tapered to a somewhat lesser degree and terminates in the usual water table carrying a crown block assembly designated generally by reference numeral 33. The crown block assembly 33 may be of any conventional type but is preferably constructed in the manner as disclosed in my prior Patent No. 2,440,427, issued April 27, 1948.

As indicated above, the derrick body 30 is pivotally mounted as at 32 with respect to a substructure or base 31. The base 31 is provided with the usual draw works and machinery designated generally by reference numeral 34 which may be of any conventional type and which is shown as being located at the rear portion of the derrick floor. A pair of lifting legs or levers 35 are pivotally mounted on the base 31 at points 36 spaced horizontally and vertically from the pivots 32. At their opposite ends, the lifting legs 35 are provided with rollers 37 engageable with tracks 38 provided on the front derrick legs for elevating the derrick body in a manner to be hereinafter more fully described. The application of lifting force to the lifting legs 35 is preferably accomplished by means of the usual traveling block 39 actuated by the draw works 34 and, in general, the operation of raising the derrick body 30 by means of the lifting legs 35 is similar to that disclosed in my prior Patent No. 2,593,246. As actually constructed, the derrick body 30 is also provided with the usual racking platform 40 which may be of any desired conventional construction and which, per se, forms no part of the present invention.

As shown particularly in Figures 20–26, the substructure or base 31 preferably comprises a pair of generally parallel side frames which are spaced apart in a horizontal plane and, being of similar construction, are both designated generally by the same reference numeral 41 (Figures 25–26). Each of the side frames 41 is preferably constructed in truss form and includes a pair of upper rails 42 and lower rails 43 all extending horizontally and being of I-beam shape in cross-section. The corresponding upper and lower rails 42—43 of each side frame 41 are preferably inter-connected by a plurality of substantially vertical beams 44 of open channel or I-beam construction and inclined braces 45 which may be of any desired cross-sectional shape (Figure 20). Each of the side frames 41 also preferably includes a plurality of horizontal transverse braces 46—47 and diagonal braces 48, the entire assembly of each side frame 41 being welded or otherwise secured together in such manner as to form a substantially rigid truss.

Referring again particularly to Figures 23–26, the side frames 41 are connected together at their lower portions by a plurality of transverse beams 49 which may be of any desired cross-section and in the preferred embodiment illustrated herein are shown as cylindrical pipes. Each of the pipes or beams 49 is provided at its opposite ends with a generally flat rectangular plate 50 welded or otherwise secured to the pipe ends in such manner as to form a projecting flange thereon. The flanged beam ends 50 are adapted to be received within a plurality of upwardly open, generally U-shaped channels provided at correspondingly spaced stations along the inner faces of the bottom rails 43. As shown particularly in Figures 23 and 24 these channels are formed by horizontal and vertical plates 51 and 52 respectively, welded or otherwise secured to the lower rails 43 at a slight distance from the web portion of the latter so as to form pockets within which the projecting portions of the plates 50 may be received and restrained therein against movement in any direction except upwardly.

At corresponding positions on the inner faces of each of the side frames 41 adjacent the central portions thereof the vertical members 44 are somewhat enlarged and take the form of I-beams or the like so as to provide two opposite pairs of channels 53. These inwardly facing channels 53 are open from top to bottom to serve as guiding members and the channels themselves are unimpeded except for abutments 54 welded or otherwise secured to the web portions of each channel 53 and provided with vertical braces 55 similarly welded to said webs. As will be noted particularly in Figure 21 each of the abutments 54 projects inwardly from the web portion 56 to which it is attached a distance appreciably less than the width, or inwardly projecting portion, of the corresponding flange portions 57 of each channel.

Referring again particularly to Figure 21 and also to Figures 25 and 26, it will be noted that a short distance above each of the abutments 54, there is provided an internally threaded reinforcing element 58 preferably welded to the outer web portion 56 of each of the beams 44. An aperture is provided in the web 56 adjacent the threaded portion of the reinforcing element 58 in alignment therewith and a bolt 59 is in threaded engagement with the reinforcing element 58 in such manner that it may be rotated to project inwardly through the web 56 for a reason which will hereinafter become more fully apparent.

In the description thus far, reference has been made in a general way to the fact that the derrick body 30 is pivotally mounted with respect to the substructure or base 31. However, as will be noted by reference to the detailed disclosure of Figures 20–26, the derrick body 30 is actually connected to a hinge assembly designated generally by reference numeral 60 which in turn is mounted for limited vertical movement relative to the side frames 41. The hinge assembly 60 when viewed from either the front or rear face of the derrick (Figures 25–26), is roughly U-shaped and comprises a generally horizontal I-beam 61 extending transversely of the base 41 having a pair of vertical I-beams or the like 62 welded or otherwise suitably secured at its opposite ends. As seen from either side face of the derrick (Figure 20) the hinge assembly 60 is generally of truss construction and, in addition to the beams 61 and 62, includes another generally horizontal beam 63 extending transversely of the base 41 forwardly of the beam 61 and connected to the latter in any suitable manner as by means of a plurality of generally horizontal beams or the like 64. The front horizontal beam 63 is also connected to the upper ends of each of the vertical beams 62 by means of diagonal beams 65 so that the hinge assembly 60 as a whole constitutes a relatively rigid truss structure. It will be understood that the hinge assembly 60 may be formed as a weldment or the various beams and braces may be riveted or bolted together as desired. The main derrick hinges 32 are formed in any convenient manner at the top of each of the vertical beams 62 and suitable gussets 66 may be provided to strengthen the hinge structure.

The construction of the overall derrick body 30 is illustrated generally in Figures 1–3, some of the more important details thereof being shown to a somewhat larger but still greatly reduced scale in Figures 12–19. As mentioned above, the derrick body 30 selected for illustration herein comprises three sections A, B and C, detachably secured together at connecting points located generally in the planes X—X and Y—Y in Figure 2. Although the derrick sections A, B and C differ from one another in construction, they are generally similar when viewed from either side of the derrick and, as seen in Figures 1 and 2, each comprises a pair of front legs 67 and a pair of rear legs 68, the front and rear legs of each derrick section being interconnected by the usual girts 69 and braces 70. The various derrick body sections A, B and C may be connected together in any convenient manner and at certain of the connecting points I prefer to employ an improved hairpin wedge lock of the type disclosed in my co-pending application Serial No. 396,201, filed December 4, 1953, and now Patent No. 2,820,658, and entitled Connecting Means for Structural Elements. However, at certain of the other connecting points, and particularly at the juncture of sections A and B, I prefer to employ an improved quick release fastener of the type illustrated in Figures 14 and 15.

As shown in Figures 3, 14 and 15, each of the front legs 67 of both of the lower derrick sections A and B is split into two parts, tapering upwardly from the hinge points 32 to a maximum width which is then maintained as the front legs extend upwardly for a substantial distance and is finally again tapered downwardly to the juncture points of sections B and C. Each of the front legs 67 of the lower sections A and B thus comprises a pair of spaced apart channels 71 arranged with their open faces in vis-a-vis position so that the longer dimension or the web portion 72 of each channel 71 is substantially parallel to the planes which contain the complete derrick sides. The spaced channels 71 of each of the front legs are rigidly connected together by a plurality of angle braces 73 which lie between the open faces of each pair of channels and are preferably welded thereto in such manner as to form a rigid truss structure.

Referring particularly to Figures 16–19, all of which are cross-sectional views taken through the entire derrick body at different vertical or longitudinal positions, it will be noted that the principal structural members of both the front and rear legs 67 and 68 comprise a pair of channels 71 as mentioned above. However, in constructing the rear legs 68 of the derrick, the channels 71 are secured together as by welding along their abutting flange portions to form a closed box member and it is to be particularly noted that in the case of the rear legs the long dimension or web portion of each channel is arranged substantially parallel to the plane which contains the rear face of the derrick or at right angles to the web portions of the corresponding channels 71 constituting the front legs of the derrick. By reason of this construction, that is, by splitting the channels forming the front legs of the derrick at the lower sections thereof and spacing them apart to form a laced truss construction, it is possible to secure maximum strength in the planes containing the side faces of the derrick and at the same time achieve the necessary rigidity and stabilizing action in the plane containing the front face of the derrick without the necessity of additional structures such as wing braces or the like. The construction just described also permits the open front face or "window" of the derrick to be wide open and unobstructed thereby affording substantially a maximum of clear visibility and working space within the derrick.

Since the derrick body 30, in general, tapers upwardly, for example as viewed in Figure 3, it is possible to construct the top derrick section C as a single integral weldment without exceeding a maximum width of approximately eight feet as permitted by most statutes governing transport over the public highways. In accordance with the present invention, therefore, both the front and rear legs 67 and 68, respectively, of the derrick body are welded together along their flange portions in the upper derrick section C. In addition, the upper section C of the derrick body is preferably provided with a plurality of girts 69 and braces 70 extending not only between the front and rear legs 67 and 68 at each side of the body but also between the two rear legs 68 and the two front legs 67 as shown in Figure 19. On the other hand, the lower derrick sections A and B are of a maximum width when assembled which is considerably in excess of that permitted by statute for movement over public highways in most jurisdictions and, therefore, in order to provide true portability, the lower sections A and B are each subdivided into a pair of similar side units which may be quickly and easily assembled or disassembled in operation.

As best illustrated in Figurs 3, 16 and 18, the front face of each of the lower derrick sections A and B, that is, the space between the split and laced front legs 67, is substantially completely unobstructed. However, each of these lower derrick sections comprises two side units which may be detachably connected together along the line Z—Z in Figures 16 and 18. In practice, each of the side units of the lower sections comprises, in addition to the front and rear legs 67—68, a laced truss element connected to one of the rear legs 68 and extending inwardly toward the center of the derrick, as designated generally by reference numeral 73. Each of the truss elements 73 comprises a beam or the like 74 preferably welded to one of the legs 68 and a diagonal brace 75 welded to one of the side girts 69, together with suitable internal bracing members such as those designated by reference numerals 76 and 77. At their juncture points located centrally in the rear face of the derrick body, each of the laced truss elements 73 is provided with a quick release fastening element designated as a whole in Figures 16 and 18 by reference numerals 78 and 79, so that the adjacent truss elements of each section may be quickly assembled or disassembled under the control of the operator.

The quick release fasteners which I have provided for connecting together the adjacent side elements of the lower derrick sections A and B are somewhat similar to the quick release fasteners employed at certain stations in connecting together adjacent leg portions of the different sections. Such a fastener for connecting together the ends of adjacent truss elements is illustrated in Figures 12 and 13 in which the fastening device is shown in its operative position. As shown in these figures, the inner ends of the tubular beams 74—75 are interconnected as by welding both beams to a pair of upper and lower plates 80—81. Similar plates 80—81 are provided for each of the fastener elements 78—79 and, preferably, an end closure plate 82 is also welded between the plates 80—81 at the outer face of the derrick. Between the ends of the beams 74—75 there is provided a pair of vertical plates 83 and 84 preferably welded to the plates 80—81 in such manner as to form a pair of open ended box frames at each side of the juncture point between the truss elements 73. It will be particularly noted that each of these box frames is generally of rectangular cross-section having a long side in the vertical plane and a short side in the horizontal plane.

Still referring to Figures 12 and 13, one of the open ended box frames between the ends of the beams 74—75 is provided with a closure element 85, shown in the present instance as being welded or otherwise suitably secured between the plates 80, 81, 83 and 84 of the fastening element 79. A bolt 86 is slidably received within an aperture formed in the plate 85 and is provided at its outer end with an elongated head 87, the bolt thus having a generally T-headed shape. At its opposite end the bolt 86 is provided with the usual nut 88 and, if desired, a washer 89 may be employed to complete the assembly.

In order to facilitate the assembly of the complementary side truss elements 73, suitable guiding or locating means is provided which, as illustrated in Figure 12, preferably takes the form of a thimble 90 welded or otherwise secured to the open end of one of the beams 74 and projecting therefrom a slight distance so that its chamfered outer end may be received within the open outer end of the opposite beam 74. Similar guiding thimbles (not shown) also may be provided if desired at the open outer ends of the beams 75. It will be particularly noted that the long dimension of the head 87 of the bolt 86 is intermediate in length between the dimensions of the long and short sides of the box frame formed by the plates 80, 81, 83 and 84. As a result, the head 87 of the bolt 86 may freely pass through the open box frame of the fastening element 78 when its long dimension is substantially parallel to the long dimension of said box frame but when the long dimension of the head 87 is out of parallelism with the long dimension of the box frame, for example, at right angles to the latter, the head 87 will abut against the inner ends of the vertical plates 83—84 which may be suitably grooved or slightly indented to receive the bolt head 87. At the same time, it will be noted that although the shank of the bolt 86 may pass freely through the aperture formed in the closure member 85, the bolt 86 will be retained as a part of the fastening element 79 as long as the nut 88 remains in place. However, it will be apparent that in order to detach the fastening elements 78—79 it will not be necessary to remove the nut 88 from the bolt 86 but merely to loosen the nut 88 sufficiently to permit the head 87 of the bolt 86 to be rotated approximately ninety degrees so that it will pass freely through the box frame of the fastening element 78. Conversely, in assembling the fastening elements 78—79, it is only necessary to insert the bolt head 87 through the box frame of the fastening element 78, rotate said head through approximately a ninety degree angle, and, by taking a relatively few turns on the nut 88, securely lock the elements 78—79 together.

At certain stations, as mentioned above, the adjacent leg ends of the different derrick sections may also be connected together by means of a quick release fastening device closely resembling that which has just been described for securing together the adjacent side truss elements 73. Such a construction is illustrated in Figures 14 and 15 in which one of the split front legs 67 of the derrick is shown at the juncture of sections A and B. In this instance, each of spaced apart channels 71 at the leg ends is provided with a pair of plates 91—92 preferably welded thereto and extending transversely therebetween. Vertical plates 93 are welded between the plates 91—92 at one of the leg ends to provide a rectangular open ended box frame 94 (Figure 14) while similar plates 95 are welded between the opposite plates 91—92 of the complementary leg end to form a box frame 96. As in the case of the quick release fastening device illustrated in Figures 12 and 13, it will be noted in Figures 14 and 15 that the head 87 of each of the T-bolts 86 has a long dimension which is intermediate in length between the long and short sides of the box frame 94 so that in one position the head 87 may pass freely through the box frame 94 but in another position will abut against the ends of the plates 91—92, preferably fitting into slight recesses 97 provided in the latter. At the same time it will be noted that the dimensions of the box frame 96 are such that the head 87 of the T-bolt 86 cannot pass therethrough under any circumstances so that as long as the nuts 88 remain in position, the bolts 86 will be held loosely within the box frames 96.

In assembling the derrick leg ends as shown in Figures 14 and 15, suitable guiding pins or dowels 98 are provided at the inner corners of the channels 71, being welded thereto and preferably provided with tapered ends for initially engaging the complementary leg ends and guiding the ends together during assembly. Completing the assembly of Figure 14, each of the T-bolts 86 is also preferably provided with a washer 89 and, if desired, a lock nut 99 for preventing accidental disengagement of the nuts 88.

As mentioned above, the derrick body 30 in accordance with the present invention is pivotally mounted at 32 on the hinge assembly 60 which constitutes in effect a portion of the substructure or base 31, being capable of only limited vertical movement relative to the latter during assembly. The means provided for raising the derrick body 30 is in certain respects similar to that described in my prior Patent No. 2,593,246 and comprises a pair of lifting legs 35 pivotally connected at 36 to the base 31 and slidably engageable at their opposite ends with tracks 38 welded or otherwise suitably secured to the front flanges of each of the front leg channels 72. The application of lifting force to the lifting legs 35 and through the latter to the tracks 38 and main derrick body 30 is accomplished by means of a plurality of sheaves or pulleys and associated lines reeved therethrough which in turn are energized by the conventional traveling block 39 of the derrick controlled by the draw works 34.

Referring now particularly to Figures 5 to 11, each of the lifting legs 35 in accordance with the present invention is in the form of a hollow cylinder or tube having a closure plate 100 (Figure 28) welded or otherwise securely attached to its lower end provided with an offset hinge element 101 adapted to be pivotally connected as at 36 to the base 31. At their opposite ends, each of the lifting legs 35 is closed by means of a somewhat similar plate 102 having a cylindrical portion welded or otherwise securely attached within the open end of the legs 35 and also having a squared portion externally of the legs 35 and provided with a pair of upwardly tapering, spaced plates 103. It will be understood that the spaced generally parallel plates 103 are in turn rigidly secured to the closure plate 102 as by welding or the like and are also joined together at their outer extremities by a generally downwardly inclined, wedge shaped member 104 preferably welded to both plates 103. The wedge shaped member 104 welded transversely between the side plates 103 at the end of the lifting leg or lever 35 constitutes a part of the automatic latch mechanism which serves to releasably retain the derrick body in raised position as will hereinafter become more fully apparent.

Still referring generally to Figures 5-11, each of the side plates 103 is suitably apertured to provide a pair of bearings within which is rotatably journaled a stub shaft 105. As seen in Figures 8, 9 and 11, the stub shaft 105 projects outwardly an appreciable distance beyond the outer face of each of the plates 103 thus providing an axle on which are rotatably mounted the rollers 37. Still farther out along the stub shaft 105 at each end of the latter are rotatably mounted the sheaves or pulleys 106—107, the entire assembly being free to rotate, that is, each of the rollers 37 and pulleys 106—107 being free to rotate relative to one another as well as relative to the shaft 105, and the entire assembly being held in place in any convenient manner as by means of conventional nuts 108 and washers 109. As will be noted particularly in Figure 11, each of the rollers 37 is provided at its outer periphery with a flange 110 which is adapted to abut the outer edge of its associated track 38 thereby tending to guide the movement of the lifting leg 35 and to prevent excessive end play between the rollers 37 and tracks 38 during a derrick raising operation.

The remainder of the latching mechanism which operates automatically and serves to retain the derrick body in raised position is mounted on the derrick body 30 itself, the parts generally being secured, as duplicate assemblies, to each of the front derrick legs 67 at approximately that region of the bottom derrick section at which said front legs bend and begin to taper inwardly or towards the rear derrick legs 68. Referring again to Figures 5–11, it will be noted that a generally upwardly inclined plate 111 is rigidly secured, as by welding or the like, between the spaced channels of each of the front legs 67 and may be further secured in position by being welded at its bottom end to a plate 112 which is likewise securely welded or otherwise attached to the opposite spaced channels of each of the front legs 67. The plates 112 likewise serve as attachment points for the lower diagonal braces 70 to which they are welded. As shown in the drawings, I have provided still further bracing elements for the latch member 111 in the form of a transverse plate 113 welded along one edge to the wedge member 111 and at its opposite ends to a pair of relatively heavy blocks 114 which in turn are welded to plates 115, the latter being welded or otherwise rigidly attached to the flanges of the respective side channels 71 of each of the front derrick legs. It will be particularly noted in Figures 5, 6 and 7 that each of the blocks 114 is inclined along its front edge portion thereby providing an inclined abutment 116 adapted to cooperate with the extreme outer edge of the latch member 104 for a purpose which will hereinafter become more fully apparent.

Referring still to Figures 5–11, and in particular to Figures 5 and 10, it will be noted that the relatively heavy blocks 114 are welded to their associated plates 115 adjacent the lower ends of the latter. A somewhat similar pair of heavy blocks 117 are also welded to the plates 115 at a sufficient distance above the blocks 114 to provide an open passageway between said blocks. A wedge shaped locking element designated generally by reference numeral 118 is mounted within this passageway above the latch member 111 and is capable of limited movement therein transversely of the derrick body or front legs 67.

As perhaps best shown in Figures 5 and 10, the wedge shaped locking element 118 is preferably formed as an open weldment having front and rear faces 119 and 120, respectively, Figure 7, welded at their opposite ends to a pair of generally vertically extending side walls 121. It will be particularly noted that the side walls 121 are of approximately the same thickness as the blocks 117 and, when the derrick body is fully elevated, serve to transmit operating loads from the derrick body through the plates 115, blocks 117, and plates 103 to the elevating legs 35. The wedge shaped locking element 118 is guided in its movement transversely of the derrick body by the upper edges of the blocks 114 on which it rests and also by the lower edges of the blocks 117 together with a reinforcing angle 122 which extends across and is preferably welded to the inner faces of the blocks 117. The angle 122 serves principally as a support point for the girt 69 which joins the front derrick leg 67 at this particular point. It will also be noted that the angle 122 similarly supports one of the derrick braces 70 to which it is likewise secured as by welding or the like.

The locking element 118, as shown in Figures 5-7, is provided with an operating shaft 123 preferably welded to the end plate 120 of the locking element 118 and extending inwardly or away from the front legs of the derrick and towards the rear legs thereof in a plane substantially parallel to the girt 69. Supporting the operating shaft 123 is a bracket 124 welded at its top end to the web of the girt 69 and having a plurality of apertures in its depending portion, in the present case three in number. The operating shaft 123 passes through the center aperture in the bracket 124 and is threaded on both sides of said aperture and provided with nuts 125 and 126 at opposite sides of the bracket 124.

The locking element 118 is also provided with a pair of guide rods 127 (Figure 11) which are also preferably welded to the rear face 120 of the locking element and extend generally parallel to the operating shaft 123. These guide rods 127 extend through the other two, or outer, apertures in the bracket 124 and are provided with compression springs 128 wound helically on each rod 127 and normally compressed between the locking element face 120 and the bracket 124. From the description thus far it will be apparent that with the nuts 125—126 turned to the positions which they occupy, for example in Figures 6 and 11, the locking element 118 may be moved right or left a total distance equal to the distance between the nuts 125 and 126, and will be resiliently urged toward the right by the compression springs 128. It should also be noted in Figures 5, 6 and 7 that the lower edges of the side members 121 of the locking element 118 are inclined upwardly or tapered to effect the wedging action relative to the latch element 104 to be hereinafter more fully described.

Referring now particularly to Figure 29, there is illustrated, in schematic form, a preferred method of reeving the different lines for the purpose of applying a lifting force to the lifting legs 35 to elevate the derrick. In order to avoid complication, substantially all structural members with the exception of the various pulleys have been omitted from Figure 29 and, in addition, the pulleys and lines for only a single lifting leg have been shown, it being understood that a duplicate arrangement is provided at the opposite side of the derrick as indicated by the broken line 130 looped over the remote side of the hook 132. As mentioned above, the necessary power for raising the derrick body with respect to the base preferably is provided by the conventional drawworks through the medium of the usual traveling block 39. The hook 132 is, of course, securely attached to or formed integrally with the traveling block 39 and moves with the latter longitudinally of the derrick body as the drawworks is operated. The upper portion of Figure 29 is thus a schematic showing of a traveling block and crown block assembly of the type more fully described in my prior Patent No. 2,440,427 to which reference may be had, if necessary, for clarification of any structural details not essential to an understanding of the present invention.

Referring still to Figure 29, there is shown a live line 134 which is adapted to be wound around the drum of the drawworks in the usual manner whenever force is to be applied to the system. The live line 134 passes under a pulley 136 which may be secured in any convenient manner in some portion of the derrick base or other relatively fixed structure, and thence extends upwardly as indicated by reference numeral 138 and passes from the back over the top of the live line sheave 140 forming a part of the crown block assembly. From the sheave 140 the live line passes downwardly as indicated by reference numeral 142 and is successively reeved between a plurality of pulleys constituting parts, respectively, of the traveling block 39 and crown block 144. After leaving the last pulley of the traveling block 39, the line passes upwardly as indicated by reference numeral 146 and passes from the front over the top of the dead line sheave 148. From the dead line sheave 148 the line extends downwardly as indicated by numeral 150 and, after passing under another pulley 152 located in the base of the derrick, extends rearwardly to some fixed anchor point as indicated by numeral 154. It will be understood that the arrangement of lines and pulleys thus far described and more fully illustrated in my said prior Patent No. 2,440,427, per se forms no part of the present invention and is set forth herein simply to illustrate an operative arrangement for applying power to the traveling block 39 and its attached hook 132.

The preferred arrangement for transmitting power from the traveling block 39 to the lifting legs 35 is illustrated schematically in the lower portion of Figure 29. As shown herein the bight of a line is slipped over the hook 132 in such manner that both of its branches 156 and 158 extend downwardly or away from the traveling block 39. The lines 156 and 158 extend around and under a pair of pulleys 160—162 which are rotatably mounted on a common axis fixed as at 164 (Figure 4) in the extreme lower portion of the derrick body at each side of the latter. From the pulleys 160—162 the lines next pass upwardly as indicated by reference numerals 166—168 and extend around the pulleys 37a and 37b which are rotatably mounted at the opposite sides of each of the lifting legs 35. After passing over and around the lifting leg pulleys 37a and 37b the lines extend downwardly as indicated at 170 and 172 and are secured anchored in any convenient manner to a bracket or the like 174 rigidly attached to the lower portion of the derrick body. For emphasis it is again noted that the arrangement just described for transmitting force from the traveling block 39 to the lifting leg 35 is but one half of the complete system, a duplicate arrangement being provided for each of the lifting legs 35 and joined to the opposite side of the hook 132 as indicated by the fragmentary showing of the cable 130. Thus as the traveling block 39 moves longitudinally of the derrick body, a substantially equal force will be applied to each of the lifting legs 35 through its associated cable assembly.

Throughout the foregoing description it is to be clearly understood that a great many of the structural details which would normally be found in an operative derrick in accordance with the present invention have been entirely omitted from the disclosure in the interests of clarity. For example, the completed derrick would undoubtedly be equipped with the usual ladders (not shown) extending upwardly along the front legs of the derrick and provided with the usual rest platforms 176 (Figure 3) at suitably spaced stations. It is also customary to provide additional reinforcing members to support the derrick floor and, although not shown or described in detail, such members may take the form of knee braces 178 (Figure 3). Another such structural detail is illustrated in Figures 4 and 27 and comprises a clevis or the like 180 suitably secured in any convenient manner near the top of the extreme front portion of the base 31 and adapted to be pinned or otherwise firmly attached to a bracket 182 fixed to the lifting leg 35, the engagement of these parts serving to further strengthen the assembly after the derrick body has been raised to fully elevated position.

Another structural element which has been substantially entirely omitted from the drawings in view of the extremely reduced scale of the latter is the beam connector shown in fragmentary fashion in Figure 22. As mentioned above, and as will become more fully apparent from the description of operation which follows, the hinge assembly 60 is capable of limited vertical movement relative to the base 31 and is actually raised upwardly during an intermediate stage of the derrick raising operation. In its raised position the hinge assembly 60 rests upon the ledges 54 (Figures 20–21) and is preferably held in place on said ledges by means of a connector of the type more fully described in my prior Patent No. 2,562,483, issued July 31, 1951. Such a connector is illustrated in part in Figure 22 wherein a stirrup 184 is shown as projecting through a suitable aperture formed in the web 56 of the channel 44 and in engagement with a locking wedge 186 thereby serving to firmly anchor the end of the transverse beam 61 to the web 56 of the vertical channel or I-beam 44 in the manner as described in my prior Patent No. 2,562,483.

*Operation*

In order that the present invention may be fully understood, the following description will cover in chronological sequence the various steps accomplished in the performance of a complete derrick raising operation. At the outset, it will be assumed that the entire derrick is completely disassembled and is to be erected for use in drilling an oil well at a newly located site. Initially, therefore, the various elements of the derrick structure will be loaded upon trucks in such manner that full compliance may be had with all statutes or ordinances restricting the maximum dimensions and/or weight of load which may be transported over the public highways. As a minimum, the base 31 will have its two sides 41 disconnected, the derrick body sections A, B and C will be disconnected from each other and from the hinge assembly 60, and at least the two lower derrick body sections A and B will be further separated into their corresponding side units.

After the various derrick elements have been trucked or otherwise transported to a suitably prepared and leveled drilling site, the first step to be taken is to arrange the sides 41 of the base 31 generally parallel to each other and properly located with respect to the center line of the well. After the base has been suitably located with respect to the well, the sides 41 are relatively loosely secured together by means of a plurality of stringers 49 which are connected, at suitable locations, to the bottom rails or beams 43 in the manner illustrated in Figures 23-26. It will be understood that in the performance of all these operations any convenient lifting device, such as a conventional truck mounted boom or the like, may be employed both for removing the various derrick elements from the trucks on which they are carried and for locating them with respect to the well site and with respect to each other.

With the base 31 suitably located, the hinge assembly 60 is next moved into position as generally indicated in Figure 26, the ends of the beams 61 and 63 sliding in guided relation with the inner channels of the centrally located vertical I-beams 53 at each side of the base. As the hinge assembly 60 is lowered between the sides 41 of the base, the ends of the transverse beams 61 and 63, after moving downwardly but a short distance, will contact the ledges 54 and will be prevented by the latter from moving downwardly with respect to the base. At this time, and while still holding a substantial part of the total weight of the hinge assembly 60 on the truck boom which has moved it into place, the bolts 59 are rotated relative to the members 58 in such manner as to abut against the ends of the beams 61 and 63 thereby slightly springing the sides of the base 41 apart at the top a sufficient distance to permit the hinge assembly to be lowered downwardly past the ledges 54. The "sprung" position of the sides 41 of the base is illustrated, to a greatly exaggerated degree, in Figure 25. However, as will be noted by reference to Figure 21, the flanges of the I-beams 53 extend inwardly an appreciable distance beyond the inner edge of the abutment 54 or, in other words, the flanges of beams 53 are wider than the abutments 54 so that even when the sides of the base are "sprung" apart a guiding channel 57 is still provided to properly guide the hinge assembly 60 as it is lowered downwardly with respect to the base 31.

Referring to Figures 25 and 26, it will be observed that the operation which has just been described will have resulted in properly locating the hinge assembly 60 with respect to the base 31 in a horizontal sense although, at this time, the hinge assembly 60 has been lowered from the position which is occupies in Figure 26 to the position in which it is shown in Figure 25. However, this lowered position of the hinge assembly, as shown in Figure 25, is not the final position which it occupies when the derrick is fully raised, but is resorted to as an intermediate step in the assembly of the complete derrick and, as previously indicated, constitutes an important feature of the present invention.

After the base and hinge assembly have been put together as illustrated in Figure 25, or depending upon available manpower, perhaps simultaneously therewith, the various elements of the derrick body will also be removed from the trucks on which they are transported and located in their approximate final positions along the ground in a line extending away from the base. While occupying these approximate final positions, the complementary side units of the lower derrick body sections A and B may be assembled together by means of the T-bolts 86 as illustrated in Figure 12. It will be particularly noted that the T-bolts 86 are held loosely in position at all times prior to assembly so that when the locking elements 78—79 are brought together (Figure 12) the T-bolts 86 will already be in approximate position so that by merely rotating the heads 87 thereof and tightening the nuts 88 the side units of section A and B will be securely locked together. In like manner, after the side units of the lower sections have been secured together, the various sections A, B and C of the derrick body may be secured together by means of the similarly shaped T-bolts 86 as illustrated in Figure 14.

After the various side units and sections of the derrick body have been attached together and the derrick body hinges 32 connected at the top of the hinge assembly, the overall appeaance of the complete derrick will be generally as indicated in Figure 1. In other words, throughout the entire job of assembling the side units and sections of the derrick body and main derrick hinges, all of the operations will have been performed with the parts in a generally horizontal position and substantially at ground level thus affording square connecting points and obviating the necessity of ladders or elevated working platforms. Again, in order that the advantages of this arrangement may be fully understood, it is necessary to emphasize the extremely reduced scale of the drawings.

For example, if the hinge assembly were not lowered in the manner previously described to permit the derrick body to be assembled substantially at ground level, a good portion of the assembly work would have to be accomplished at positions around twenty feet above ground level. In accordance with the method of the present invention, however, such difficult and potentially dangerous operations are avoided and in addition to the obvious safety factor thereby achieved, the amount of time and labor involved in assembling the derrick is materially simplified.

After the derrick body and main derrick hinges have been assembled, as shown in Figure 1, the hinge assembly having the lower end of the derrick body hingedly attached thereto may be elevated from the position shown in Figure 25 to that of Figure 26. This lifting operation may be accomplished by the same truck mounted boom or other device previously referred to and during the lifting operation the hinge assembly will be guided in the channels of the vertical I-beams 53 in the same manner as previously described in connection with the lowering operation. The bolts 59 may be retracted or unscrewed either before the beginning of the raising of the hinge assembly or after the latter has reached a position slightly above the ledges 54 but, in any event, as soon as this latter condition is reached the "sprung" condition of the derrick base will no longer exist, so that the hinge assembly with the derrick body pivotally attached thereto may be lowered slightly to rest upon the hinges 54. At this time the hinge assembly is securely locked in position in any convenient manner as by means of the wedge lock assembly illustrated in Figure 22 and more fully described in my prior Patent No. 2,562,483, following which the usual derrick floor may be constructed and the upper beams 42 of the base connected together to support the usual drawworks 34. The lifting legs 35 are also now pivotally connected at 36 to the base at opposite sides of the latter and the various lines and pulleys are reeved to the traveling block 39 in the manner illustrated in Figure 29.

Upon completion of the operations thus far described the complete derrick will occupy the position as generally indicated by full lines in Figure 2, that is, the pairs of rollers 37 at the end of each of the lifting legs 35 will be in engagement with their corresponding tracks 38 on the front legs of the derrick body and the traveling block 39 will be under a slight strain preparatory to beginning the actual derrick raising operation. At this point it is only necessary to operate the drawworks to cause the traveling block to move upwardly within the derrick body which in turn will apply force through the lifting legs 35 will be evenly divided. The application of lifting position and to the final substantially vertical position illustrated in broken lines in Figure 2.

It will be understood that throughout the derrick raising operation both of the lifting legs 35 will be effective to apply lifting force to their associated front legs 67 and, since duplicate cable and pulley systems are provided for each of the lifting legs 35, the application of lifting force from the traveling block 39 to the lifting legs 35 will be evenly divided. The application of lifting force to the lifting legs 35 and through the latter to the main derrick body is accomplished in a manner similar to that disclosed in my prior Patent No. 2,593,246. However, as the main derrick body approaches fully elevated position, the automatic latch mechanism in accordance with the present invention becomes operative and will now be described in greater detail.

Referring now to Figures 5 to 11 inclusive, the operation of the automatic latch mechanism in accordance with the present invention is illustrated by means of sequence views showing the different parts in the relative positions which they occupy during the final stages of a complete derrick raising operation. During the greater portion of the derrick raising operation, force is being applied to the front legs 67 of the main derrick body by the lifting legs 35 through the rollers 37 which are freely rotatable and which remain in engagement with the tracks 38. Throughout this major portion of the derrick raising operation the various elements of the automatic latching mechanism remain relatively fixed in position as shown in Figure 5 and it is not until the rollers 37 approach the ends of the tracks 38 that the automatic latch mechanism comes into operation. As shown in Figure 5, therefore, the nuts 125 and 126 have been separated a sufficient distance to permit the wedge shaped locking element 118 to move freely within the space provided between the blocks 114 and 117. Accordingly, under the urgence of the springs 128 the locking element 118 is forced inwardly or to the right in Figure 5 and projects outwardly a slight distance beyond the front legs 67 so that it may be contacted by the end of the lifting leg 35 as the latter approaches its limit of travel.

Referring now to Figure 6, it will be noted that the lifting leg 35 has traveled downwardly from its position as shown in Figure 5 to a point where the roller 37 is about to leave the track 38 and the side plates 103 at the extreme end of the lifting leg 35 have already come into contact with the outer ends of the side plates 121 of the movable locking element 118 thereby forcing the latter as a whole inwardly or to the left in Figure 6 against the compression of the springs 128. At this stage the automatic latch mechanism is in a sense "cocked" and ready to operate upon a slight additional movement of the lifting leg 35.

The next, and final, position of the lifting leg 35 is illustrated in Figure 7. In this figure the roller 37 has moved downwardly beyond the track 38 and the transverse member 104 at the end of the lifting leg 35 has moved inwardly into gripping engagement with the rear or inner face of the plate 111 which is secured to the derrick legs 67. In this position the extreme end of the lifting leg 35, as represented by the upper surface of the transverse element 104, has also passed completely beyond the movable locking element 118 so that the latter, under the impetus of the springs 128, has moved to the right thereby securely locking the elements 104 and 111 in engagement. By reason of the inclined or tapered lower edges of the side plates 121 of the sliding wedge lock 118, the locking element 104 will be securely pressed into and held in engagement with the locking element 111. At this time, that is immediately upon movement of the spring pressed locking element 118 to the right, the application of lifting force to the lifting leg 35 is discontinued and, in order to hold the parts against accidental displacement, the nut 126 may be threaded against the bracket 124 (to the left in Figure 7) thereby positively preventing any movement of the sliding wedge lock 118 to the left and in turn preventing accidental disengagement of the latching elements 104 and 111.

In accordance with the present invention the lifting legs 35 not only serve to elevate the main derrick body into fully raised position, but also serve as structural members to carry a portion of the normal derrick operating loads. Thus, with the parts occupying the positions as shown in Figure 7, operating loads from the main derrick body will be transmitted from the front legs 67 through the plates 115, blocks 117, blocks 121, and blocks 103 directly to the lifting leg structure 35. As shown in Figures 5 and 6, the blocks 114 which are mounted below the sliding wedge element 118 and secured to the front derrick leg 67 are provided with slightly inclined front faces 116 which are adapted to engage in abutting relation with the front edges of the side plates or blocks 103 at the top of the lifting leg 35. Thus, during final movement of the lifting leg 35, and after the locking elements 104 and 111 are overlapped but not quite fully engaged, the plates or blocks 103 will be forced outwardly, or to the right in Figure 7, by means of the blocks 114 in such manner as to slightly disengage the rollers 37 from the tracks 38 so that the normal derrick operating loads will be transmitted directly to the lifting legs 35 and will not cause undue wear upon the rollers 37. This position of the parts is illustrated best in Figure 8.

It will be understood that after the derrick body has been fully elevated and locked in elevated position by means of the automatic latch mechanism just described, the traveling block 39 may be disconnected from the lines 158 and 156 and also the opposite line 130 and, thereafter may be employed in its usual manner in the drilling of the well or other operation. After the well has been completed or the derrick has otherwise served its purpose, the main derrick body may be lowered and dismantled for transport to another site by means of a series of operations which are substantially the reverse of those just described. Thus, after the lines have been reeved to connect the traveling block 39 to the lifting leg pulleys 37, as shown in Figure 29, the nut 126 may be backed away from the bracket 124 and the nut 125 rotated to abut the bracket 124 in such manner as to force the operating shaft 123 to the left to retract the locking element 118. Throughout this operation a strain will be held on the traveling block 39 and by merely slacking this strain the natural forces produced by the center of gravity of the derrick body lying away from the main derrick hinge 32 will cause the derrick body to start downwardly, the rollers 37 being in engagement with the tracks 38 and exerting a restraining force on the derrick body.

After the main derrick body reaches a position substantially as shown in full lines in Figure 2, the locking wedges 186 (Figure 22) may be withdrawn and the bolts 59 (Figure 21) operated in such manner as to "spring" the sides 41 of the derrick base apart a sufficient distance to permit the hinge assembly 60 to be lowered from the position of Figure 26 to the position of Figure 25. At this point the derrick body will occupy the positions substantially as shown in Figure 1 and may be disconnected from the hinge assembly and separated into its various sections and units by disconnecting the various T-bolts utilized in the assembly operation. After this has been done the base may be completely disassembled and the various elements of the derrick and base once again mounted upon trucks or other vehicles for transport to storage or to a new drilling site.

It will be apparent that numerous other modifications, alterations and deviations from the specific structure which has been shown and described herein solely for the purpose of illustration of a preferred embodiment will occur to one skilled in the art and it is obvious that the same may be made without departing from the spirit and scope of the invention as defined in the following claims.

I claim:

1. A derrick structure comprising a base, a derrick body, means pivotally connecting said body to said base for swinging movement between a substantially horizontal inoperative position and a substantially vertical operative position, elongated lifting means pivotally mounted adjacent one end on said base and slidably engageable adjacent the opposite end with said body for raising and lowering the latter, and automatic latch means for positively retaining said body in operative position comprising a first latch member fixedly secured to said body, generally inclined upwardly and toward said lifting means, a second latch member fixedly secured to said lifting means adjacent the slidable end thereof, generally inclined downwardly and toward said body, said latch members engaging when said body reaches erect, operative position, a wedge shaped locking member, mounted in said body above said first latch member when said derrick body is in vertical operative position, for limited linear movement transversely of said body, spring means operatively associated with said body and said locking member and resiliently urging the latter into extended locking position when said latch members are in latched position, an operating shaft attached to said element, and means having mechanical connection with said shaft and with said body for positively moving said element in both directions whereby said latch members may be positively locked in engaged position.

2. A derrick structure comprising a base, a derrick body, means pivotally connecting said body to said base for swinging movement between a substantially horizontal inoperative position and a substantially vertical operative position, elongated lifting means pivotally mounted adjacent one end on said base and slidably engageable adjacent the opposite end with said body for raising and lowering the latter, and automatic latch means for positively retaining said body in operative position comprising a first latch member fixedly secured to said body, a second latch member fixedly secured to said lifting means adjacent the slidable end thereof, said latch members engaging when said body reaches erect, operative position, a locking member mounted in said body above said first latch member when said derrick body is in vertical operative position, for limited linear movement transversely of said body, means resiliently urging said locking element into extended locking position when said latch members are in latched position, and means for positively moving said element in both directions whereby said latch members may be positively locked in engaged position.

3. A derrick structure comprising a base, a derrick body, hinge means pivotally mounting said body on said base, at least one lifting leg pivotally mounted at one end on said base at a point horizontally and vertically removed from said hinge means and having a roller at its opposite end, a track mounted on said body and having its lower end terminating above said hinge means, said track being engageable by said roller for raising and lowering said body, and automatic latch means for positively retaining said body in raised operative position comprising a first latch member on said body beneath the lower end of said track, a second latch member on said leg adjacent said roller, a locking element slidably mounted in said body above said first latch member, resilient means yieldingly urging said element into extended locking position, means for positively moving said element in opposite directions, and an inclined abutment on said body adjacent said first latch member, said second latch member being engageable with both said first latch member and said abutment and being positively held in such engaged position by said element whereby said roller is maintained out of contact with said track and said element serves to transmit operating loads between said leg and said body when the latter is in raised operative position.

4. A derrick structure comprising a base, a derrick body, hinge means pivotally mounting said body on said base, at least one lifting leg pivotally mounted at a point removed from said hinge means and having a roller mounted thereon, a track mounted on said body and having its lower end terminating above said hinge means, said track being engageable by said roller for raising and lowering said body, and automatic latch means for positively retaining said body in raised operative position comprising a first latch member on said body beneath the lower end of said track, a second latch member on said leg adjacent said roller, a locking element slidably mounted in said body above said first latch member, resilient means yieldingly urging said element into extended locking position, and an inclined abutment on said body adjacent said first latch member, said second latch member being engageable with both said first latch member and said abutment and being positively held in such engaged position by said element whereby said roller is maintained out of contact with said track and said element serves to transmit operating loads between said leg and said body when the latter is in raised operative position.

5. A derrick structure comprising a base, a derrick body, hinge means pivotally mounting said body on said base, at least one lifting leg pivotally mounted at a point removed from said hinge means and having a roller mounted thereon, a track mounted on said body and having its lower end terminating above said hinge means, said track being engageable by said roller for raising and lowering said body, and automatic latch means for preventing overtravel of said body as the latter approaches raised operative position comprising a first latch member on said body beneath the lower end of said track, a second latch member on said leg adjacent said roller, and an inclined abutment on said body adjacent said first latch member, said second latch member being engageable with both said first latch member and said abutment whereby said roller is maintained out of contact with said track when said body is in raised operative position.

References Cited in the file of this patent

UNITED STATES PATENTS

| | | |
|---|---|---|
| 1,816,715 | Barnhart | July 28, 1931 |
| 2,129,466 | Furguson | Sept. 6, 1938 |
| 2,345,650 | Attwood | Apr. 4, 1944 |
| 2,421,172 | Ulrich et al. | May 27, 1947 |
| 2,429,009 | Woolslayer et al. | Oct. 14, 1947 |
| 2,459,198 | St. John | Jan. 18, 1949 |
| 2,465,813 | Moore | Mar. 29, 1949 |
| 2,593,246 | Bender | Apr. 15, 1952 |
| 2,656,023 | Woolslayer et al. | Oct. 20, 1953 |
| 2,664,178 | Whipple | Dec. 29, 1953 |
| 2,711,804 | Woolslayer et al. | June 28, 1955 |
| 2,781,108 | Selberg et al. | Feb. 12, 1957 |

FOREIGN PATENTS

| | | |
|---|---|---|
| 1,036,375 | France | Apr. 22, 1953 |